May 13, 1969 — A. N. KURTZ — 3,444,203
PRODUCTION OF METHYLAMINES
Filed July 29, 1965

INVENTOR
ABRAHAM N. KURTZ

INVENTOR
ABRAHAM N. KURTZ 3,444,203
PRODUCTION OF METHYLAMINES
Abraham N. Kurtz, Charleston, W. Va., assignor to Union Carbide Corporation, a corporation of New York
Filed July 29, 1965, Ser. No. 475,671
Int. Cl. C07c 87/08, 85/02
U.S. Cl. 260—583                    13 Claims

ABSTRACT OF THE DISCLOSURE

A mixture of mono-, di- and trimethyl amines is produced by the reaction of hydrogen, carbon monoxide and ammonia at elevated temperatures and pressures in the presence of a catalyst containing copper deposited on alumina or chromia having a surface area of at least 1 square meter per gram. This process is also applicable to the production of other methyl amine derivatives by substituting a primary or secondary hydrocarbyl amine for ammonia.

---

Figure 1:
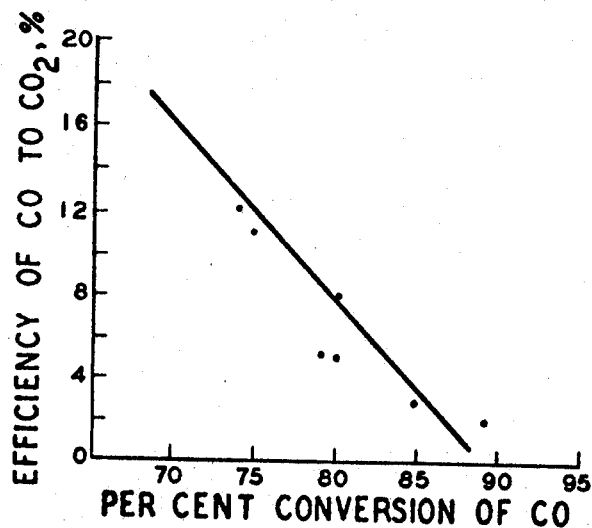

This invention relates to a novel method for the production of methylamines. More particularly, this invention is concerned with a process for replacing at least one hydrogen atom of ammonia or a primary or secondary amine with a methyl group. In a still more particular and preferred aspect, this invention is concerned with a method for the production of mono-, di- and trimethylamines by the catalytic reaction of ammonia, hydrogen and carbon monoxide.

In the past, methylamines have been manufactured by the reaction of ammonia with methanol, which, in turn, was prepared by the reaction of hydrogen and carbon monoxide. It has been recognized that it would be desirable to synthesize methylamines in one step directly from hydrogen, carbon monoxide and ammonia. To date, however, no process has been reported which achieves this result. For example, Clark, in U.S. Patent 2,518,754, discloses the reaction of hydrogen, carbon monoxide and ammonia in the presence of a Fischer-Tropsch catalyst to produce a mixture of primary, secondary and tertiary amines containing up to 12 carbon atoms, with higher-alkyl primary monoamines predominating. Similarly, Bashkirov et al., in Doklady Akad. Nauk. S.S.S.R., 109, 774–6 (1956), (Chem. Abs., 51, 4931e (1957)), Izvest. Akad, Nauk. S.S.S.R., Otdel, Khim. Nauk., 1958, 504–6 (Chem. Abs., 52 17091b (1958)) and Russian Patent 133,890 (1960) (Chem. Abs., 55 14308f (1961) disclose the reaction of ammonia, hydrogen and carbon monoxide in the presence of certain iron catalysts to produce predominantly primary alkyl monoamines of up to 20 carbons. Eidus et al., however, in Izvest. Akad. Nauk., S.S.S.R. Otdel, Khim. Nauk., 1950, 287–90 (Chem. Abs. 44 8087c (1950)) report that, contrary to their expectations, a mixture of ammonia, hydrogen and carbon monoxide, when passed over a cobalt catalyst, did not react to form methylamines or amines of any kind. Rather, the presence of ammonia apparently poisoned the catalyst, with the result that even hydrocarbon synthesis was inhibited. Further, the only product derivable from ammonia which was detected was ammonium carbonate, said to have resulted by reaction of carbon dioxide, a product of the "shift reaction" ($CO+H_2O \rightarrow CO_2+H_2$), with ammonia. Thus, to date, reported attempts to react ammonia, hydrogen and carbon monoxide to produce amines have either failed or have produced a mixture of numerous amine homologs, many of which are of little commercial value.

It has been unexpectedly and surprisingly discovered by this invention that hydrogen, carbon monoxide and ammonia, when contacted with certain copper catalysts at elevated temperatures and pressures, react to produce methylamines, i.e., monomethylamine, dimethylamine and trimethylamine, to the exclusion of higher alkylamines, although methanol and methane are produced in minor amounts. The process of this invention is not limited to ammonia, however, and primary and secondary amines can be methylated by this process by the substitution of at least one amino hydrogen by a methyl group. These reactions are illustrated by the general equations:

(1) $H_2+CO+NH_3 \rightarrow NH_2CH_3+NH(CH_3)_2+N(CH_3)_3$
(2) $H_2+CO+RNH_2 \rightarrow RNHCH_3+RN(CH_3)_2$
(3) $H_2+CO+RRNH \rightarrow RRNCH_3$ wherein R is an organic radical.

In general, then, the process of this invention comprises contacting hydrogen, carbon monoxide and a nitrogen base having at least one amine hydrogen, i.e., a hydrogen bonded to nitrogen, (ammonia or a primary or secondary amine) at elevated temperatures and pressures in the presence of a copper catalyst, as hereinafter defined, for a period of time sufficient to convert at least a portion of the nitrogen base to an N-methyl derivative.

The mechanism is not fully understood, but it is believed that the reaction occurs first by the hydrogenation of carbon monoxide to methanol and reaction of the methanol with the nitrogen base to produce a methylamine. There is some evidence, however, that suggests that a methanol intermediate, such as formaldehyde, reacts with the nitrogen base to produce a hydroxymethyl-amine which is then hydrogenated to the corresponding methylamine. Still other evidence suggests that, when ammonia is the nitrogen base, trimethylamine may be formed by the reaction of monomethylamine with dimethylamine, rather than by the reaction of methanol or formaldehyde with dimethylamine. Regardless of mechanism, however, the nitrogen products of the process of this invention are solely the N-methyl derivatives of the nitrogen base charged.

The process of this invention is considerably superior to the two-step synthesis of methylamines via the reaction of carbon monoxide with hydrogen to produce methanol followed by the reaction of methanol with ammonia to produce methylamines. For example, when hydrogen and carbon monoxide in a mole ratio of 2:1 are reacted at 350° C. and 3000 p.s.i.g. in contact with a copper-zinc-ferrochrome-chromia catalyst, the conversion of carbon monoxide to methanol is about 56 percent. Under the same conditions, but with ammonia added in a molar ratio of ammonia to carbon monoxide of 3.7:1, the conversion of carbon monoxide to methylamines plus methanol was 81 percent, for an improvement of almost 50 percent in the conversion of carbon monoxide to useful products.

A major problem with regard to the development of the process of this invention arises due to the formation of water as a by-product. The water can react with the feed carbon monoxide via the "shift reaction," with the production of carbon dioxide and hydrogen. The formation of carbon dioxide can represent a serious loss of efficiency of the process. In addition, the carbon dioxide thus produced can react with the nitrogen base or amine products to form carbonate or carbamate salts. Although the free nitrogen base or amine product is readily formed by basic hydrolysis, this additional step further adds to the expense of the process. Moreover, the carbonate or carbamate salts have a tendency to form solid deposits on relatively cool surfaces, thus plugging reaction lines, inactivating the catalyst and the like. It has been found by this invention, however, that the extent of the shift reaction can be inhibited to a considerable degree by proper control of reaction conditions, as will be more fully described below.

The nitrogen bases which may be employed in the process of this invention are represented by the general formula XX'NH, wherein each X and X', when taken individually, is hydrogen or a monovalent organic radical and X and X', when taken together, form a divalent organic radical which, when taken with the amino group (>NH), forms a heterocyclic ring of from 5 to 6 ring members. Included within this broad class of compounds are ammonia, alkylamines such as methylamine, ethylamine, hexylamine, decylamine, dodecylamine, eicosylamine and the like; dialkylamines such as dimethylamine, diethylamine, didodecylamine and the like; aromatic amines such as aniline, naphthylamine and the like; diarylamines such as diphenylamine, phenyl naphthylamine, dinaphthylamine and the like; heterocyclic amines such as pyrrole, tetrahydropyrrole, piperidine, indole, morpholine and the like; polyamines such as ethylenediamine, tetramethylenediamine, diethylenetriamine and the like, as well as various substituted derivatives of these and other amines. Preferred amines are those of the formula $R^1R^2NH$ wherein each $R^1$ and $R^2$, when taken individually, is hydrogen or a monovalent hydrocarbyl radical free from non-benzenoid unsaturation, i.e., alkyl, aryl, aralkyl, alkaryl and the like, of up to about 20 carbons. This process is of special applicability to the production of methylamines from ammonia.

The catalysts which are employed in accordance with this invention contain as essential components thereof copper and at least one member of the group of alumina or chromia, and have a surface area of at least one square meter per gram. No activity is observed if either component is missing. For example, no methylamine synthesis activity is observed employing either a composition containing copper deposited on fused alumina having a surface area of only 0.55 square meters per gram or a composition containing chromia and alumina but no copper. It is believed, however, that copper is the primary catalytic component, with alumina and/or chromia serving as promoters, for these catalysts are highly resistant to poisoning by materials such as halogen, sulfur, phosphines, amides, pyridine and the like, a characteristic of copper catalysts. Catalyst compositions having surface areas in excess of about 10 square meters per gram are especially preferred.

The amounts and proportions of the essential components are not narrowly critical to the process of this invention, provided the composition has the desired catalytic activity. In general, compositions containing at least about 10 weight percent of combined copper, calculated at the oxide, and chromia and/or alumina in an atomic ratio of copper to chromium plus aluminum (Cu/(Cr+Al)) of from about 0.05:1 to about 8:1 are useful for producing methylamines.

Chromia is preferred over alumina because of its higher overall activity and superior efficiency for the synthesis of methylamines. Alumina does have the advantage, however, of suppressing the formation of tertiary amines. Thus, when ammonia is employed as the feed nitrogen base, a copper-alumina catalyst provides an amine product which is predominantly the more desirable monomethylamine and dimethylamine under conditions at which a copper-chromia catalyst provides a product which is predominantly trimethylamine.

In addition to copper, alumina and chromia, the catalyst may contain other ingredients to modify either the physical or reaction-promoting properties of the catalyst, such as zinc, iron, barium, cobalt and the like without departing from the essential feature of this invention, the production of methylamines to the substantial exclusion of higher homologs thereof. Moreover, these additional components may be present in amounts exceeding the combined amount of copper and chromia and/or alumina. For example, one of the preferred catalysts for the process of this invention is obtained from a composition containing 6.3 weight percent of copper oxide, 22.3 parts by weight of chromia, 51.5 parts by weight of zinc oxide and 13.5 parts by weight of ferrochrome.

The catalysts employed in the process of this invention are prepared by any suitable technique known to the art. One desirable technique comprises impregnating a chromia and/or alumina composition, which may contain various inert binders, diluents and the like, having the desired surface area with an aqueous solution of a copper salt, for example, copper nitrate, as well as other desired metal salts. The impregnated composition is then dried and roasted to decompose and convert at least the copper salt to an oxide. The resulting composition is then activated by reducing at least a portion of the copper oxide to metallic copper, as by heating at about 300° C. in a hydrogen atmosphere for a period of about 24 hours.

The catalyst can be employed in any suitable form, such as pellets, granules, and the like. Moreover, the catalyst may be deposited on inert carriers if desired, although the alumina or chromia generally have sufficient strength to render the use of supports unnecessary.

The process of this invention may be conducted continuously or batchwise, with the feed components being in the liquid or vapor phase. A preferred technique is to continuously pass the feed components through a fixed bed of catalyst. When this technique is employed for a vapor-phase reaction, for example, when ammonia is the nitrogen base, it is preferred that the catalyst bed comprises small catalyst particles, generally less than about 4 mesh, for example 4 to 100 mesh, in admixture with particles of a thermally-conductive material, preferably copper. A bed of this nature is desirable to minimize the formation of hot spots due to the poor heat transfer obtained in vapor-phase reactions of this nature, because it has been found that the hot spots tend to promote the shift reaction and, thus, increase yields of carbon dioxide and reduce efficiencies to amines. The development of hot spots is substantially minimized by the use of small catalyst particles diluted with thermally-conductive metal particles. In general, the particles of catalyst and metal should be approximately the same size and in the range of from about 4 to about 50 mesh. The amount of metal employed should be at least 20 percent of the bed volume, and can be as high as 80 volume percent or more. Equal volumes of catalyst and metal are preferred.

By the term "thermally-conductive" metal is meant a metal or metal alloy having a thermal conductivity at 0° C. of at least about 0.02 calories/(second)(square centimeter)(° C./centimeter), with metals or alloys having thermal conductivites of at least $$0.2 \text{ cal.}/(\text{sec.})(\text{cm}^2)(° \text{ C./cm.})$$

being preferred. Illustrative metals and alloys include copper, aluminum, duralumin, brass, zinc, iron, steel, and the like. Copper is preferred because of its high thermal conductivity and relatively low cost.

The reaction conditions of temperature, pressure, residence time and ratio of feed components are not narrowly critical to the production of methylamines, and suitable conditions include temperatures of from about 250° C. or below to about 450° C. or above, pressures of from about 500 p.s.i.g. or below to about 10,000 p.s.i.g. or above, residence times of from about 1 minute or less to about 24 hours or more, hydrogen/carbon monoxide molar ratios of from about 0.3:1 or lower to about 6:1 or higher, and nitrogen base/carbon monoxide ratios of from about 0.5 or less to about 10 or more molar equivalents of nitrogen base per mole of carbon monoxide. By the term "molar equivalents" of nitrogen base is meant the product of the average number of amine hydrogens, i.e., the number of hydrogens bonded to nitrogen, and the number of moles of nitrogen base. For example, one mole of ammonia contains three molar equivalents of nitrogen base, one mole of a primary monoamine contains two molar equivalents of nitrogen base and one mole of a diamine such as ethylenediamine contains four molar equivalents of nitrogen base .

Although reaction conditions are not critical with regard to the production of methylamines, they must be controlled within fairly narrow ranges to achieve a commercially-acceptable process, as has been indicated previously, with the most important variable being the degree of conversion of carbon monoxide. In general, the extent of the shift reaction, and, thus, the efficiency of carbon monoxide to carbon dioxide, is inversely related to carbon monoxide conversion. This dependence is illustrated in FIGURE 1, wherein the efficiency to carbon dioxide is plotted against carbon monoxide conversion for the ammonia-hydrogen-carbon monoxide system. The data from which the curve of FIGURE 1 was derived were obtained from a number of continuous runs conducted at an average temperature of about 370° C., an average pressure of about 4500 p.s.i.g., an average hydrogen/carbon monoxide mole ratio of about 4.2:1, an average ammonia/carbon monoxide ratio of about 2:1 and an average feed rate of about 19 moles of feed per hour. As can be seen, under these general conditions the efficiency of carbon monoxide to carbon dioxide decreases from about 16 percent to about 2 percent as the single-pass conversion of carbon monoxide increases from about 72 percent to about 87 percent. Carbon monoxide conversions of at least about 80 percent are preferred under these conditions to achieve a commercially-acceptible process.

Figure 2:
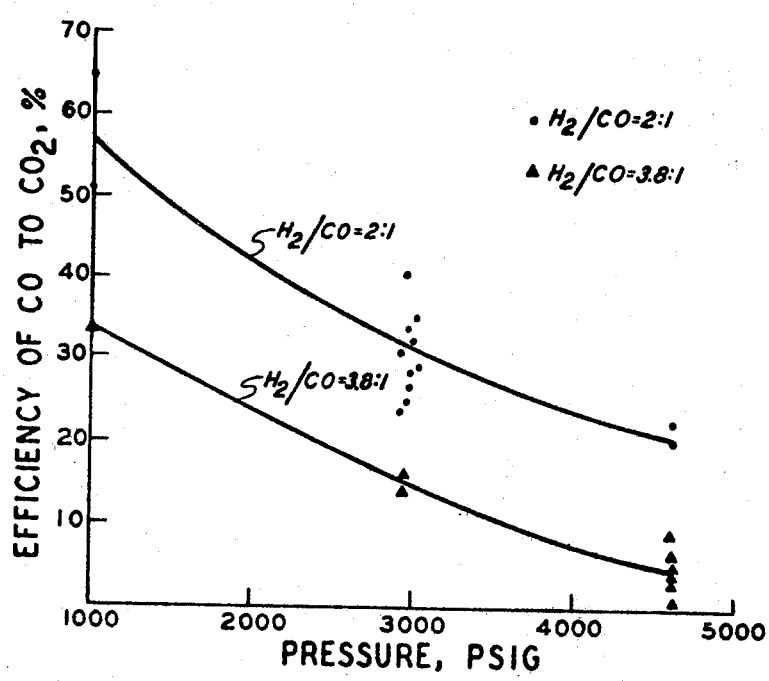

The conversion of carbon monoxide and, thus, the efficiency to carbon dioxide, is most directly affected by total pressure and the hydrogen/carbon monoxide mole ratio. These effects are readily seen in FIGURE 2, wherein the efficiency of carbon dioxide production is plotted against total pressure at hydrogen/carbon monoxide ratios of 2:1 and about 3.8:1 for a number of experiments at an average temperature of about 370° C., an average ammonia/carbon monoxide mole ratio of about 1.1:1 and an average feed rate of about 15.3 moles per hour. As is seen from FIGURE 2, the efficiency decreases with increasing pressure over the range of 1000 to 4500 p.s.i.g. In addition, the use of a hydrogen/carbon monoxide ratio of 3.8:1 (lower curve) results in a substantially lower efficiency of carbon monoxide to carbon dioxide than that obtained at a ratio of 2:1 (upper curve). Based on FIGURE 2, it is preferred that the total reaction pressure be in the range of from about 4000 to about 5000 p.s.i.g. and the ratio of hydrogen to carbon monoxide be in the range of from about 3:1 to about 5:1.

Carbon monoxide conversion is also affected to some degree by space velocity, with higher conversions resulting from lower space velocities. In general, space velocities in the range of from about 1 to about 500 volumes of feed at reaction conditions per volume of catalyst bed per hour can be employed, although space velocities of from about 5 to about 50 volumes per volume per hour are preferred.

Temperature has little effect on the ultimate yields of amines because, although reaction rate increases with temperature, the maximum limiting conversion to amines decreases with increasing temperature. Temperatures of at least of about 300° C., and especially at least about 350° C. are preferred, however, for commercial operation. Further, it is preferred that the temperature be no greater than about 400° C., for catalyst life is adversely effected by sustained operation at more elevated temperatures.

The nitrogen base to carbon monoxide ratio, although having little effect on carbon monoxide conversion or carbon monoxide efficiency, does have a significant effect on the distribution of the product methylamines, with the proportion of tertiary amines decreasing with increasing nitrogen base/carbon monoxide mole ratios. This effect is readily seen in FIGURE 3, wherein the mole percent of trimethylamine in the methylamine product from the reaction of ammonia, hydrogen and carbon monoxide is plotted against ammonia/carbon monoxide ratio. The percent of trimethylamine decreases rapidly with increasing ammonia/carbon monoxide mole up to a ratio of about 1 to about 1.5, and then more slowly with a further increase in the ammonia/carbon monoxide ratio. Moreover, at ratios in excess of about 1:1 to about 1.5:1, the total pressure has an observable effect on the proportion of trimethylamine, with higher pressures providing higher yields of trimethylamine. Accordingly, when ammonia is the nitrogen base, it is preferred to employ ammonia/carbon monoxide ratios of at least 1:1, with ratios in the range of from about 1.5:1 to about 3:1 being preferred; that is, at least 3 molar equivalents and preferably 4.5 to 9 molar equivalents of nitrogen base per mole of carbon monoxide. Temperature and the hydrogen to carbon monoxide mole ratio have not been observed to affect the amine distribution.

The net production of any of the methylamines can also be reduced by recycling the amine produced in excessive amounts. For example, at ammonia/carbon monoxide ratios of about 2:1, the net production of trimethylamine can be reduced to essentially zero by feeding approximately 5 mole percent of trimethylamines, based upon ammonia in the feed, to the reaction.

Although, by proceeding in accordance with the conditions described above, the production of carbon dioxide can be substantially reduced, there nevertheless will be some carbon dioxide in the effluent gas. As indicated previously, this carbon dioxide can react with ammonia or amines to produce carbonates or carbamates which can plug the reaction system and product lines. Accordingly, in a continuous process, it is preferred to contact the reactor effluent at a temperature above about 150–200° C. with an aqueous medium. Generally, water is sufficient to dissolve these salts, but an aqueous medium having a basic pH, i.e., a pH in excess of 7, for example an aqueous alkali metal hydroxide such as sodium hydroxide, not only will dissolve these salts, but will effect liberation of the free amine. Amines are recovered from the resulting aqueous solution by conventional procedures. The vapor stream, containing unreacted hydrogen and ammonia, as well as excess product amine, can be recycled to the reaction as desired.

When employing the water feed it is desirable to provide a diffusion carrier between the catalyst bed and the point of water feed. Otherwise water may diffuse into the bed and cause the production of carbon dioxide by the shift reaction. A suitable diffusion bed comprises a bed of fine sand, for example of less than about 40 mesh.

The following examples are illustrative.

EXAMPLE 1

A 1-inch I.D., vertically-positioned, jacketed tubular reactor equipped with an axial ¼-inch O.D. thermowell was charged with a 2-inch layer of 40- to 325-mesh sand and then with 300 milliliters of a mixture of equal volumes of 6 x 14 mesh copper shot and 6 x 14 mesh particles of a catalyst having a surface area of 10.1 square meters per gram and containing 51.5 weight percent zinc oxide, 6.3 weight percent cupric oxide, 22.3 weight percent chromic oxide, 13.5 weight percent ferrochrome and the balance binders. The catalyst was reduced by heating at 300° C. for one day while passing hydrogen through the catalyst bed. Thereafter, the bed was heated to 374±11° C. and a mixture of ammonia, hydrogen and carbon monoxide in a molar ratio of 2.2:4.7:1, respectively, was fed down through the bed at 4500 p.s.i.g. and a rate of 22 moles per hour for a period of 2 hours. Throughout the run, water was added to the hot reactor effluent at a rate of 110 milliliters per hour. The aqueous product was fed to a product receiver at reaction pressure and 25° C. A portion of the aqueous product was analyzed for carbon dioxide by potentiometric titration with a standardized aqueous solution of hydrochloric acid. Two breaks in the curve of pH vs. milliequivalents acid added were observed; the first at a pH of about 8–8.5 and the second at a pH of about 4.3–4.8. The amount of carbon dioxide was determined from the difference in these values. A portion of the aqueous condensate was analyzed for ammonia, methyl amines, methanol and water content by vapor phase chromatography. The composition of the vapor effluent was analyzed by Orsat analysis or mass spectrometry for carbon monoxide, hydrogen, methane and trimethylamine content. The total basicity of the crude aqueous product, which corresponds to the number of moles of ammonia fed, was calculated from the second end point of the potentiometric titration.

The conversion of carbon monoxide was 89 percent, with amines, carbon dioxide and methane being produced at efficiencies of 95, 2 and 3 percent, respectively. The conversion of ammonia was 16.5 percent with monomethylamine, dimethylamine and trimethylamine being produced at efficiencies of 41, 29, and 30 percent, respectively.

EXAMPLE 2

Employing apparatus and techniques similar to those described in Example I, a mixture of ammonia, trimethylamine, hydrogen and carbon monoxide in a molar ratio of 1.24:0.042:4.08:1.02, respectively, at 4500 p.s.i.g. was fed at a rate of 16 moles per hour for 4 hours to the catalyst bed, which was maintained at 361±8° C. Carbon monoxide conversion was 80 percent, with efficiencies of 87 percent to amines, 5.3 percent to carbon dioxide, 5.4 percent to methane and 1.9 percent to methanol. Ammonia conversion was 32 percent, with efficiencies of 48 percent to monomethylamine, 35 percent to dimethylamine and only 17 percent to trimethylamine.

EXAMPLE 3

Employing apparatus and procedures similar to those described in Example 1, two runs were conducted on each of two different catalysts. The first catalyst (Catalyst A) comprised a 200-milliliter bed of the catalyst described in Example 1 in the form of ⅜-inch pellets, and without copper shot. The second catalyst (Catalyst B) was a 184-milliliter bed of ⅛-inch pellets of a composition having a surface area of 8.63 square meters per gram and containing 80 percent copper oxide, 17 percent chromic oxide and the balance binders. The data for these runs are summarized in Table I. Because of the difficulty of obtaining comparable process conditions for single runs due to the nature of the process and the equipment employed, the averages of the two runs with each catalyst are also set forth. It is believed that these averages provide a more accurate means of comparing the effect of varying process conditions than do the individual runs.

TABLE I

|  | Individual runs | | | | Average data | |
|---|---|---|---|---|---|---|
| Run No | 1 | 2 | 3 | 4 | 1 | 2 |
| Catalyst | A | A | B | B | A | B |
| Reaction conditions: | | | | | | |
| Feed mole ratios: | | | | | | |
| NH₃/CO | 1.0 | 1.3 | 0.71 | 1.1 | 1.2 | 0.9 |
| H₂/CO | 2.0 | 2.0 | 2.0 | 2.0 | 2.0 | 2.0 |
| Temperature, °C | 352 | 363 | 349 | 374 | 358 | 362 |
| Pressure, p.s.i.g | 2,975 | 2,950 | 3,050 | 3,000 | 2,960 | 3,025 |
| Feed rate, moles/liter/hour | 77 | 73 | 88 | 82 | 75 | 85 |
| Results: | | | | | | |
| Conversion, percent: | | | | | | |
| Carbon monoxide | 79 | 79 | 75 | 79 | 79 | 77 |
| Ammonia | 24 | 19 | 27 | 15 | 22 | 21 |
| Efficiency, percent: | | | | | | |
| Based on carbon monoxide: | | | | | | |
| Amines | 57 | 59 | 51 | 51 | 58 | 51 |
| Carbon dioxide | 25 | 37 | 31 | 33 | 31 | 32 |
| Methanol | 9 | 1 | 13 | 0 | 5 | 6 |
| Methane | 9 | 3 | 5 | 16 | 6 | 11 |
| Based on ammonia: | | | | | | |
| Monomethylamine | 41 | 40 | 36 | 16 | 41 | 26 |
| Dimethylamine | 30 | 33 | 28 | 34 | 32 | 31 |
| Trimethylamine | 29 | 27 | 35 | 49 | 38 | 42 |

Figure 3:
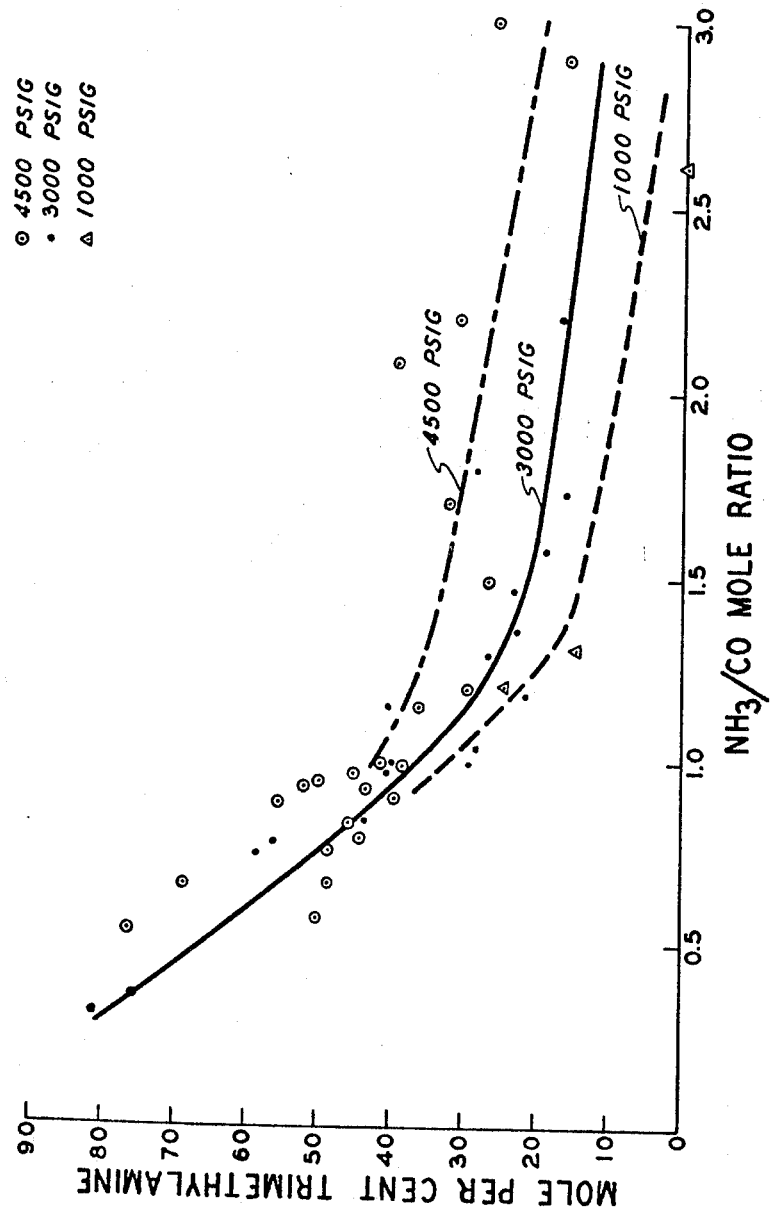

As can be seen by the data summarized above, the two catalyst have substantially similar activity. The most significant difference is in the distribution of product methylamines, which is due to the differences in the ammonia/carbon monoxide ratio, which are of substantial significance in the range of about 1.0 and below as is shown in FIGURE 3.

EXAMPLE 4

Employing apparatus and procedures similar to those described in Example 1, several runs at different conditions were made employing either Catalyst A of Example 3 or a bed consisting of 182 milliliters of a catalyst consisting of ⅛-inch pellets of a composition having a surface area of 16.1 square meters per gram and containing 33 percent copper oxide, 9.5 percent barium oxide and 38 percent chromic oxide, the balance being binders (Catalyst C). The results of these runs and their averages are summarized in Tables II and III.

TABLE II

|  | Individual runs | | | | | Averaged data | |
| --- | --- | --- | --- | --- | --- | --- | --- |
| Run No | 1 | 2 | 3 | 4 | 5 | 1 | 2 |
| Catalyst | A | A | C | C | C | A | C |
| Reaction conditions: | | | | | | | |
| Feed mole ratios: | | | | | | | |
| NH₃/CO | 1.3 | 2.6 | 2.1 | 2.3 | 2.4 | 2.0 | 2.3 |
| H₂/CO | 2.0 | 2.0 | 2.0 | 2.0 | 2.0 | 2.0 | 2.0 |
| Temperature, °C | 362 | 362 | 360 | 360 | 378 | 362 | 366 |
| Pressure, p.s.i.g | 975 | 975 | 1,000 | 1,000 | 1,000 | 975 | 1,000 |
| Feed rate, moles/liter/hour | 64 | 47 | 57 | 45 | 54 | 55 | 52 |
| Results: | | | | | | | |
| Conversion, percent: | | | | | | | |
| Carbon monoxide | 24 | 19 | 64 | 51 | 61 | 21 | 59 |
| Ammonia | 5.8 | 2.4 | 9.7 | 6.4 | 9.4 | 4.1 | 8.4 |
| Efficiency, percent: | | | | | | | |
| Based on carbon monoxide: | | | | | | | |
| Amines | 47 | 35 | 58 | 43 | 53 | 41 | 51 |
| Carbon dioxide | 51 | 65 | 36 | 35 | 33 | 58 | 35 |
| Methanol | 1 | 0 | 0 | 1 | 0 | 1 | 0 |
| Methane | 1 | 0 | 6 | 21 | 14 | 1 | 14 |
| Based on ammonia: | | | | | | | |
| Monomethylamine | 64 | 100 | 54 | 63 | 63 | 82 | 60 |
| Dimethylamine | 22 | 0 | 29 | 25 | 26 | 11 | 27 |
| Trimethylamine | 14 | 0 | 18 | 12 | 11 | 7 | 14 |

TABLE III

|  | Individual runs | | | | | | | Averaged data | |
| --- | --- | --- | --- | --- | --- | --- | --- | --- | --- |
| Run No | 1 | 2 | 3 | 4 | 5 | 6 | 7 | 1 | 2 |
| Catalyst | A | A | A | A | C | C | C | A | C |
| Reaction Conditions: | | | | | | | | | |
| Feed mole ratios: | | | | | | | | | |
| NH₃/CO | 1.0 | 2.2 | 1.3 | 1.8 | 1.0 | 1.0 | 2.4 | 1.6 | 1.5 |
| H₂/CO | 2.0 | 2.0 | 2.0 | 2.0 | 2.0 | 2.0 | 2.0 | 2.0 | 2.0 |
| Temperature, °C | 352 | 370 | 363 | 357 | 350 | 350 | 350 | 360 | 350 |
| Pressure, p.s.i.g | 2,957 | 3,000 | 2,950 | 2,975 | 3,200 | 3,030 | 2,975 | 2,975 | 3,070 |
| Feed rate, moles/liter/hour | 77 | 95 | 73 | 48 | 74 | 51 | 63 | 73 | 63 |
| Results: | | | | | | | | | |
| Conversion, percent: | | | | | | | | | |
| Carbon monoxide | 79 | 73 | 79 | 73 | 90 | 73 | 70 | 76 | 78 |
| Ammonia | 24 | 11 | 19 | 13 | 22 | 20 | 11 | 17 | 18 |
| Efficiency, percent: | | | | | | | | | |
| Based on Carbon monoxide: | | | | | | | | | |
| Amines | 57 | 49 | 59 | 60 | 50 | 53 | 60 | 56 | 54 |
| Carbon dioxide | 25 | 27 | 37 | 37 | 25 | 24 | 30 | 32 | 26 |
| Methanol | 19 | 1 | 1 | 0 | 12 | 7 | 1 | 3 | 7 |
| Methane | 9 | 23 | 3 | 3 | 13 | 16 | 9 | 9 | 13 |
| Based on ammonia: | | | | | | | | | |
| Monomethylamine | 41 | 57 | 40 | 46 | 38 | 41 | 57 | 46 | 45 |
| Dimethylamine | 30 | 28 | 33 | 27 | 27 | 30 | 26 | 29 | 28 |
| Trimethylamine | 29 | 17 | 27 | 28 | 35 | 29 | 16 | 25 | 27 |

From the data of Table II it can be seen that barium, when added to a copper-chromia catalyst, tends to inhibit the shift reaction at low pressures (1000 p.s.i.g.), but has little inhibiting effect at pressures of about 3000 p.s.i.g. (Table III). Note also that with both catalyst the proportion of trimethylamine in the amine product varied directly with pressure.

EXAMPLE 5

Employing apparatus and techniques similar to Example 1, several experiments were conducted employing as the catalyst bed and admixture of 100 milliliters of 6 x 14 mesh copper shot and 200 milliliters of ⅛-inch pellets of a composition containing 62 percent copper oxide, 5 percent cobalt oxide and 33 percent alumina. (Catalyst D). The data for these runs are summarized in Table IV, together with the averaged data for several runs conducted under similar conditions, but employing 150 milliliters of catalyst A in admixture with 150 milliliters of 6 x 14 mesh copper shot.

TABLE IV

|  | Individual runs | | | | | Averaged data | |
| --- | --- | --- | --- | --- | --- | --- | --- |
| Run No | 1 | 2 | 3 | 4 | 5 | 1 | 2 |
| Catalyst | A | A | D | D | D | A | D |
| Reaction conditions: | | | | | | | |
| Feed mole ratios: | | | | | | | |
| NH₃/CO | 0.53 | 0.66 | 0.41 | 0.64 | 0.94 | 0.6 | 0.66 |
| H₂/CO | 2.0 | 2.0 | 2.0 | 2.0 | 2.0 | 2.0 | 2.0 |
| Temperature, °C | 340 | 333 | 354 | 354 | 359 | 337 | 356 |
| Pressure, p.s.i.g | 4,500 | 4,500 | 4,000 | 4,500 | 4,500 | 4,500 | 4,300 |
| Feed rate, moles/liter/hour | 56 | 57 | 49 | 48 | 56 | 57 | 51 |
| Results: | | | | | | | |
| Conversion, percent: | | | | | | | |
| Carbon monoxide | 74 | 75 | 46 | 43 | 43 | 75 | 44 |
| Ammonia | 35 | 30 | 20.5 | 14.5 | 9.8 | 33 | 15 |
| Efficiency, percent: | | | | | | | |
| Based on carbon monoxide: | | | | | | | |
| Amines | 65 | 67 | 28 | 34 | 32 | 66 | 31 |
| Carbon dioxide | 21 | 23 | 30 | 36 | 30 | 22 | 32 |
| Methanol | 8 | 3 | 0 | 0 | 0 | 6 | 0 |
| Methane | 4 | 7 | 41 | 28 | 37 | 6 | 35 |
| Based on ammonia: | | | | | | | |
| Monomethylamine | 13 | 18 | 61 | 59 | 63 | 16 | 6 |
| Dimethylamine | 11 | 14 | 23 | 24 | 25 | 13 | 2 |
| Trimethylamine | 76 | 68 | 16 | 17 | 12 | 72 | 1 |

The data of Table IV establishes that the alumina-promoted catalyst (Catalyst D) is less active than the chromia-promoted catalyst, as is indicated by the low conversions. Moreover, although the efficiencies of carbon monoxide to carbon dioxide are about the same for the two catalysts, the efficiency to amines was considerably lower for the alumina catalyst due to its high hydrocarbon (methane) synthesis activity. On the other hand, the alumina catalyst was quite effective in suppressing the formation of trimethylamine, reducing the molar percent of trimethylamine in the amine product from about 70 percent with catalyst a to only about 15 percent.

EXAMPLE 6

Employing apparatus and techniques similar to those described in Example 1, except that the catalyst bed was 121 milliliters of ⅜-inch pellets of catalyst A, a series of experiments was conducted to determined whether benzene could be employed to inhibit the shift reaction. The results of these experiments are summarized in Table V.

weighed 146 grams, discharged, and the liquid phase distilled under reduced pressure. There was recovered 68.5 grams of a pale liquid boiling below 275° C. at atmospheric pressure, which was found by vapor phase chromatography to contain 34.9 percent N-methylaniline and 18.0 percent N,N-dimethylaniline, representing yields of 22 percent and 10 percent, respectively, based on aniline.

EXAMPLE 8

The experiment of Example 7 was repeated, except that 93.2 grams (0.5 mole) of dodecylamine were substrituted for the aniline and the reaction was conducted for one day at 300° C. while maintaining the pressure above 800 p.s.i.g. by the addition of synthesis gas $$(H_2CO=2:1 \text{ mole ratio})$$

There were recovered 123 grams of liquid product. A 10-gram aliquot was distilled and the first cut (b. 98–104° C. at 1.1 mm. Hg), which weighed 4.8 grams, was found by vapor phase chromatography to contain 78.6 percent

TABLE V

| Run No. | Individual runs | | | | | | | Averaged data | |
|---|---|---|---|---|---|---|---|---|---|
| | 1 | 2 | 3 | 4 | 5 | 6 | 7 | 1 | 2 |
| Reaction conditions: | | | | | | | | | |
| Feed mole ratios: | | | | | | | | | |
| $NH_3/CO$ | 1.2 | 1.03 | 1.72 | 1.21 | 1.10 | 1.0 | 1.10 | 1.1 | 1.2 |
| $H_2/CO$ | 2.0 | 2.0 | 2.0 | 2.0 | 2.0 | 2.0 | 2.0 | 2.0 | 2.0 |
| Benzene/CO | 0 | 0 | 0.19 | 0.25 | 0.22 | 0.24 | 0.23 | 0 | 0.23 |
| Temperature, °C | 351 | 366 | 375 | 367 | 362 | 379 | 374 | 359 | 371 |
| Pressure, p.s.i.g | 3,000 | 2,960 | 2,975 | 2,975 | 2,985 | 2,975 | 2,975 | 2,980 | 2,980 |
| Feed rate, moles/liter/hour | 117 | 122 | 158 | 139 | 131 | 153 | 144 | 120 | 145 |
| Results: | | | | | | | | | |
| Conversion, percent: | | | | | | | | | |
| Carbon Monoxide | 54 | 52 | 60 | 44 | 44 | 54 | 51 | 53 | 51 |
| Ammonia | 11.5 | 14.8 | 9.4 | 11.6 | 11.0 | 16.9 | 14.0 | 13.2 | 12.6 |
| Efficiency, percent: | | | | | | | | | |
| Based on carbon monoxide: | | | | | | | | | |
| Amines | 46 | 55 | 47 | 51 | 47 | 47 | 49 | 51 | 48 |
| Carbon dioxide | 46 | 36 | 49 | 46 | 47 | 47 | 44 | 41 | 47 |
| Methanol | 7 | 6 | 2 | 0 | 3 | 2 | 4 | 7 | 2 |
| Methane | 1 | 3 | 2 | 3 | 3 | 4 | 3 | 2 | 3 |
| Based on ammonia: | | | | | | | | | |
| Monomethylamine | 42 | 40 | 46 | 53 | 46 | 56 | 51 | 41 | 50 |
| Dimethylamine | 37 | 32 | 36 | 36 | 37 | 37 | 37 | 35 | 33 |
| Trimethylamine | 22 | 28 | 18 | 10 | 16 | 8 | 12 | 25 | 17 |

Although benzene did not inhibit the shift reaction, and in fact tended to promote the formation of carbon dioxide, its use did substantially reduce the proportion of trimethylamine in the reaction product.

Other materials which were evaluated as inhibitors include halogen in the form of 1,2-dichloroethane and n-butyl bromide, formamide, pyridine, sulfur in the form of lauryl mercaptan, and tributylphosphine. None of these additives suppressed the shift reaction. Dichloroethane, formamide, pyridine and tributylphosphine were without any observable effect. Butyl bromide appeared to promote the shift reaction. Lauryl mercaptan gave a temporary increase in hydrocarbon (methane) synthesis activity. These results suggest that copper is the active species of the catalysts employed in accordance with this invention, because copper is generally known to be relatively insensitive to poisoning.

EXAMPLE 7

A one-liter rocker autoclave was charged with 50 grams of a catalyst consisting of 51.5 weight percent zinc oxide, 6.3 weight percent cupric oxide, 22.3 weight percent chromic oxide, 13.5 weight percent ferrochrome and the balance binders, in the form of ⅜″ x ⅜″ pellets. After purging with nitrogen, the catalyst was reduced by heating at 300° C. under 500 p.s.i. of hydrogen for one day. After cooling to room temperature, the autoclave was charged with 93.1 grams (1 mole) of aniline, pressured with 800 p.s.i. (2.2 moles) of carbon monoxide and 1600 p.s.i. (4.4 moles) of hydrogen, sealed and heated at 300° C. for 16 hours. After cooling to room temperature, the autoclave was opened, the contents, which N,N-dimethyldodecylamine, representing a yield of 43.7 percent based on dodecylamine.

What is claimed is:

1. The process for producing a methylamine which comprises contacting a mixture of hydrogen, carbon monoxide and a nitrogen base having at least one amine hydrogen with, as a catalyst, a composition containing as essential components copper in the form of its metal and at least one member of the group consisting of alumina and chromia, said composition having a surface area of at least one square meter per gram, at elevated temperatures and pressures for a period of time sufficient to convert at least a portion of said nitrogen base to an N-methyl derivative thereof.

2. The process for producing a methylamine which comprises contacting a mixture of hydrogen, carbon monoxide, and a nitrogen base of the formula $R^1R^2NH$, wherein each $R^1$ and $R^2$, when taken individually, is a member selected from the group consisting of hydrogen and hydrocarbyl free from non-benzenoid unsaturation and having up to 20 carbon atoms with, as a catalyst, a composition containing as essential components copper in the form of its metal and at least one member of the group consisting of alumina and chromia, said composition having a surface area of at least one square meter per gram, at elevated temperatures and pressures for a period of time sufficient to convert at least a portion of said nitrogen base to an N-methyl derivative thereof.

3. The process for producing a methylamine which comprises contacting a mixture of hydrogen, carbon monoxide, and a nitrogen base of the formula $R^1R^2NH$, wherein each $R^1$ and $R^2$, when taken individually, is a member selected from the group consisting of hydrogen and hydrocarbyl free from non-benzenoid unsaturation and having up to 20 carbon atoms with, as a catalyst, a composition containing as essential components copper in the form of its metal and at least one member of the group consisting of alumina and chromia, said composition having a surface area of at least one square meter per gram and having an atomic ratio of Cu/(Al+Cr) in the range of from about 0.05/1 to about 8:1, at elevated temperatures and pressures for a period of time sufficient to convert at least a portion of said nitrogen base to an N-methyl derivative thereof.

4. The process for producing a methylamine which comprises contacting a mixture of hydrogen, carbon monoxide and a nitrogen base having at least one amine hydrogen in proportions such that the molar ratio of hydrogen to carbon monoxide is from about 0.3:1 to about 6:1 and the ratio of molar equivalents of nitrogen base to moles of carbon monoxide is from about 0.5:1 to about 10:1 with, as a catalyst, a composition containing as essential components copper in the form of its metal and at least one member selected from the group consisting of alumina and chromia, said composition having a surface area of at least 10 square meters per gram and a Cu/(Al+Cr) atomic ratio of from about 0.05:1 to about 8:1, at a temperature of from about 250° C. to about 450° C. and a pressure of from about 500 p.s.i.g. to about 10,000 p.s.i.g., for a period of time sufficient to convert at least a portion of said nitrogen base to an N-methyl derivative thereof.

5. The process for producing a methylamine which comprises contacting a mixture of hydrogen, carbon monoxide and a nitrogen base of the formula $R^1R^2NH$, wherein each $R^1$ and $R^2$, when taken individually, is a member selected from the group consisting of hydrogen and hydrocarbyl free from non-benzenoid unsaturation of up to about 20 carbons, in proportions such that the molar ratio of hydrogen to carbon monxide is from about 0.3:1 to about 6:1 and the ratio of molar equivalents of nitrogen base to moles of carbon monoxide is from about 0.5:1 to about 10:1 with, as a catalyst, a composition containing as essential components copper in the form of its metal and at least one member selected from the group consisting of alumina and chromia, said composition having a surface area of at least 10 square meters per gram and a Cu/(Al+Cr) atomic ratio of from about 0.05:1 to about 8:1, at a temperature of from about 250° C. to about 450° C. and a pressure of from about 500 p.s.i.g. to about 10,000 p.s.i.g., for a period of time sufficient to convert at least a portion of said nitrogen base to an N-methyl derivative thereof.

6. The process for producing a methylamine which comprises contacting a mixture of ammonia, hydrogen and carbon monoxide in proportions such that the molar ratio of ammonia to carbon monoxide is from about 1:1 to about 3:1 and the molar ratio of hydrogen to carbon monoxide is from about 3:1 to about 5:1 with, as a catalyst a composition containing as essential components copper in the form of its metal and at least one member selected from the group consisting of alumina and chromia, said composition having a surface area of at least one square meter per gram and wherein the atomic ratio of Cu/(Al+Cr) is from about 0.5:1 to about 8:1, at a temperature of from about 300° C. to about 450° C. and a pressure of from about 4000 p.s.i.g. to about 5000 p.s.i.g. for a period of time sufficient to convert at least a portion of said ammonia to an N-methyl derivative thereof.

7. The process as claimed in claim 6 wherein at least a portion of the trimethylamine produced is recycled in an amount of up to that amount necessary to reduce the net production of trimethylamine to essentially zero.

8. The process for producing a methylamine which comprises contacting a mixture of ammonia, hydrogen and carbon monoxide in proportions such that the molar ratio of ammonia to carbon monoxide is from about 1:1 to about 3:1 and the molar ratio of hydrogen to carbon monoxide is from about 3:1 to about 5:1 with, as a catalyst, a composition containing as essential components copper in the form of its metal and chromia, said composition having a surface area of at least one square meter per gram and a copper/chromium atomic ratio of from about 0.05:1 to about 8:1, at a temperature of from about 350° C. to about 400° C. and a pressure of from about 4000 p.s.i.g. to about 5000 p.s.i.g for a period of time sufficient to convert at least a portion of said ammonia to an N-methyl derivative thereof.

9. The process as claimed in claim 8 wherein at least a portion of the trimethylamine produced is recycled in an amount of up to that amount necessary to reduce the net production of trimethylamine to essentially zero.

10. A continuous process for the production of methylamines which comprises continuously feeding a mixture of ammonia, hydrogen and carbon monoxide in proportions such that the molar ratio of the ammonia to carbon monoxide is from about 1:1 to about 3:1 and the molar ratio of hydrogen to carbon monoxide is from about 3:1 to about 5:1 to a reaction zone at a pressure of from about 4000 p.s.i.g. to about 5000 p.s.i.g. and a temperature of from about 350° C. to about 400° C., said reaction zone comprising a fixed bed of a catalyst composition in admixture with a thermally-conductive metal, said catalyst composition containing as essential components copper and chromia, with the space velocity of said feed being in the range of from about 1 to about 500 volumes of feed per volume of catalyst bed per hour.

11. The process as claimed in claim 10 wherein at least a portion of the trimethylamine produced is recycle in an amount of up to that amount necessary to reduce the net production of trimethylamine to essentially zero.

12. A continuous process for the production of methylamines which comprises continuously feeding a mixture of ammonia, hydrogen and carbon monoxide in proportions such that the molar ratio of the ammonia to carbon monoxide is from about 1:1 to about 3:1 and the molar ratio of hydrogen to carbon monoxide is from about 3:1 to about 5:1 to a reaction zone at a pressure of from about 4000 p.s.i.g. to about 5000 p.s.i.g. and a temperature of from about 350° C. to about 400° C., said reaction zone comprising a fixed bed of a catalyst composition in admixture with copper as a thermally-conductive material, said catalyst composition and said copper being in the form of particles of less than about 4 mesh and of approximately equal size and present in proportions such that the catalyst composition comprises about 20 to about 80 volume percent of the bed, said catalyst composition containing as essential components copper and chromia in proportion such that the atomic ratio of copper to chromium is in the range of from about 0.05:1 to about 8:1, with the space velocity of said feed being in the range of from about 5 to about 50 volumes of feed per volume of catalyst bed per hour, thereafter contacting the reaction effluent with an aqueous medium having a pH of at least 7 in an amount sufficient to dissolve substantially all of the ammonium salts present in said reaction effluent.

13. The process as claimed in claim 12 wherein at least a portion of the trimethylamine produced is recycled in an amount of up to that amount necessary to reduce the net production of trimethylamine to essentially zero.

References Cited

Bashkirov et al., Chemical Abstracts, vol. 57, page 16,373f (1962).

CHARLES B. PARKER, *Primary Examiner.*

R. L. RAYMOND, *Assistant Examiner.*

U.S. Cl. X.R.

260—247, 293, 319.1, 577, 585